(12) United States Patent
Perritt, Jr.

(10) Patent No.: US 12,370,829 B1
(45) Date of Patent: Jul. 29, 2025

(54) VEHICLE TRACTION RECOVERY SYSTEM WITH DYNAMIC SELF-FEEDING MECHANISM

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 0 days.

(21) Appl. No.: 19/177,557

(22) Filed: Apr. 12, 2025

(51) Int. Cl.
*B60B 39/12* (2006.01)

(52) U.S. Cl.
CPC ........ *B60B 39/12* (2013.01); *B60B 2900/721* (2013.01)

(58) Field of Classification Search
CPC ........................ B60B 39/12; B60B 2900/721
USPC ........................................................ 238/14
See application file for complete search history.

(56) References Cited

U.S. PATENT DOCUMENTS

| | | | | |
|---|---|---|---|---|
| 4,211,366 | A * | 7/1980 | Czarnota | B60B 39/12 |
| | | | | 238/14 |
| 4,826,077 | A * | 5/1989 | Egy | B60B 39/12 |
| | | | | 238/14 |
| 5,538,183 | A * | 7/1996 | McGee | B60B 39/12 |
| | | | | 238/14 |
| 7,229,232 | B2 * | 6/2007 | Amelung, Sr. | E01C 9/08 |
| | | | | 238/14 |
| 7,581,507 | B2 | 9/2009 | Kern | |
| 8,167,219 | B2 | 5/2012 | Lynn | |
| 8,448,877 | B1 * | 5/2013 | Aubin | B60C 27/00 |
| | | | | 238/14 |
| 8,651,154 | B1 | 2/2014 | Chira | |
| 10,315,098 | B2 | 6/2019 | Nobil | |
| 10,421,508 | B2 | 9/2019 | Blackburn | |
| 2003/0089437 | A1 | 5/2003 | Poitras | |
| 2005/0224152 | A1 | 10/2005 | Zumach | |
| 2012/0012663 | A1 * | 1/2012 | Studstill | B60B 39/00 |
| | | | | 238/14 |
| 2012/0273582 | A1 * | 11/2012 | Lynn | B60B 39/12 |
| | | | | 238/14 |

(Continued)

FOREIGN PATENT DOCUMENTS

| | | | | |
|---|---|---|---|---|
| GB | 2563603 | A * | 12/2018 | B60B 39/12 |
| WO | WO-2020131156 | A1 * | 6/2020 | B60B 39/12 |

*Primary Examiner* — S. Joseph Morano
*Assistant Examiner* — James William Jones

(57) ABSTRACT

A traction recovery system for vehicles on low-friction surfaces featuring a multi-layered flexible strip with a self-feeding mechanism that utilizes wheel rotation to position itself beneath a tire automatically. The system comprises an upper traction engagement layer with asymmetrical directional ridges, a middle reinforcement layer with a modified honeycomb pattern, and a lower ground engagement layer with microscale suction elements and directional friction pads. A tapered leading edge with decreasing thickness facilitates initial positioning, while progressive elevation segments create a gradual ramp to elevate the tire. The bidirectional gripping mechanism of the lower layer provides effective coefficient of friction values of 0.6-0.8 even on smooth ice. Progressive elevation segments with temperature-responsive foam cells and integrated thermal conductors provide stable performance on ice. An optional multi-strip deployment mechanism enhances rapid recovery. When not in use, the system can be rolled along predetermined flex lines reinforced against material fatigue for compact storage.

19 Claims, 11 Drawing Sheets

Exploded View Showing Multi-Layered Construction

(56) References Cited

U.S. PATENT DOCUMENTS

| | | | |
|---|---|---|---|
| 2013/0008972 A1* | 1/2013 | Lubinitsky | B29B 17/00 |
| | | | 238/14 |
| 2017/0136817 A1* | 5/2017 | Rosier | B60B 39/12 |
| 2017/0174000 A1* | 6/2017 | Dagrossa | B60B 39/12 |
| 2021/0129586 A1* | 5/2021 | Shahzad | E01B 29/40 |
| 2021/0339565 A1* | 11/2021 | Nommensen | B60B 39/12 |
| 2023/0124379 A1* | 4/2023 | Wobser | B60B 39/00 |
| | | | 180/16 |

* cited by examiner

Perspective View of Traction Recovery System

Exploded View Showing Multi-Layered Construction

Sequential Side Views of Self-Feeding Mechanism

FIG. 3A: Initial Positioning

FIG. 3B: Initial Engagement & Pulling

FIG. 3C: Progressive Elevation

FIG. 3D: Full Engagement

Top View Showing Tread Engagement Surface

FORWARD

Bottom View Showing Ground Engagement Surface

FORWARD

Cross-Sectional View Along Line of FIG. 1

Detailed View of Tapered Leading Edge

Detailed View of Progressive Elevation Segments

Force Distribution Analysis

VEHICLE TRACTION RECOVERY SYSTEM WITH DYNAMIC SELF-FEEDING MECHANISM

CROSS-REFERENCES TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL

Not applicable

STATEMENT REGARDING PRIOR DISCLOSURES BY THE INVENTOR OR A JOINT INVENTOR

Not applicable

FIELD OF THE INVENTION

The present invention relates generally to vehicle recovery devices and more particularly to a specialized traction enhancement system for vehicles immobilized on low-friction surfaces such as ice, snow, mud, sand, or similar terrain.

BACKGROUND

Vehicles frequently become immobilized when their tires lose traction on slippery surfaces. Conventional solutions include sand, cat litter, floor mats, or commercial traction boards. However, these solutions suffer from significant limitations: sand and cat litter provide only temporary, localized traction; floor mats can be damaged and often slide away under tire rotation; and commercial traction boards are typically rigid, bulky, and difficult to position correctly under partially sunken tires.

Existing traction devices generally require precise placement under the tire and often become dislodged during recovery attempts. Additionally, most solutions require external force to maintain their position during initial tire rotation, presenting a significant challenge when a vehicle is operated by a single person.

Therefore, an unmet need remains for an effective traction recovery system that utilizes the rotational energy of the wheel to self-position beneath a tire, while providing superior gripping capabilities on multiple low-friction surfaces and remaining portable when not in use.

BRIEF SUMMARY

The present invention addresses the aforementioned limitations by providing a dynamic traction recovery system with a novel self-feeding mechanism that utilizes wheel rotation to position itself under a tire automatically.

In one aspect, the invention comprises a multi-layered flexible strip with a specialized upper surface that engages with tire treads, a reinforced core layer providing tensile strength, and a bottom surface featuring a proprietary arrangement of multi-directional gripping elements that adhere to slippery surfaces without becoming embedded.

In another aspect, the invention includes a tapered leading edge with a unique geometry that facilitates initial engagement with a rotating tire, drawing the strip underneath through principles of mechanical advantage rather than requiring precise manual positioning.

In yet another aspect, the invention incorporates progressive elevation segments that create a gentle ramp, reducing the initial torque required to begin vehicle movement while distributing weight gradually to prevent the strip from being pushed forward.

In a further aspect, the invention features a novel interlocking lateral stabilization system that prevents sideways slippage during tire engagement while maintaining flexibility for storage.

In yet a further aspect, the invention includes a proprietary rolling mechanism that allows the strips to be stored compactly without structural degradation or memory effect that would compromise functionality upon deployment.

BRIEF DESCRIPTION OF THE SEVERAL VIEWS OF THE DRAWINGS

To identify the discussion of any particular element or act easily, the most significant digit or digits in a reference number refer to the figure number in which that element is first introduced.

DETAILED DESCRIPTION

The detailed description set forth below in connection with the appended drawings is intended as a description of exemplary embodiments of the present invention and is not intended to represent the only forms in which the present invention may be constructed or utilized.

Structure and Components

Figure 1:
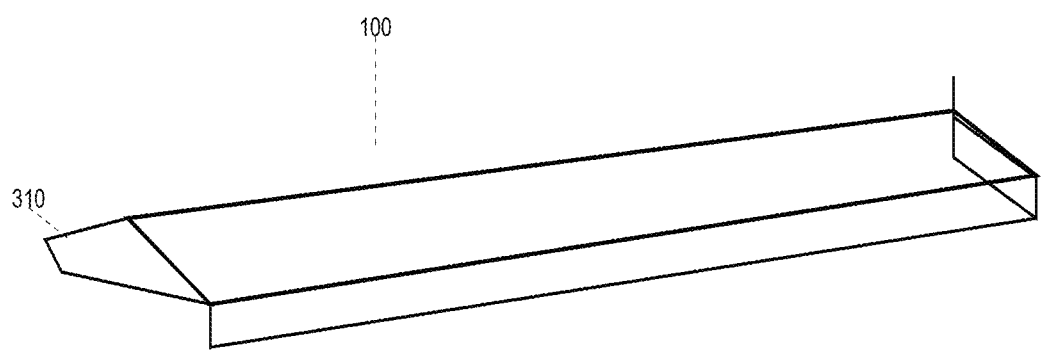
FIG. 1 shows a perspective view of the traction recovery system.

FIG. 1 is a perspective view of the traction recovery system 100 according to a preferred embodiment of the present invention. The traction recovery system 100 comprises an elongated flexible strip having a length dimension substantially greater than its width dimension, which is in turn substantially greater than its thickness dimension. The strip has a tapered leading edge 310. In the preferred embodiment, the length is approximately 48 inches (122 cm), the width is approximately 12 inches (30.5 cm), and the thickness varies between 0.5 and 0.9 inches (1.3-2.3 cm) depending on the specific section.

Figure 2:
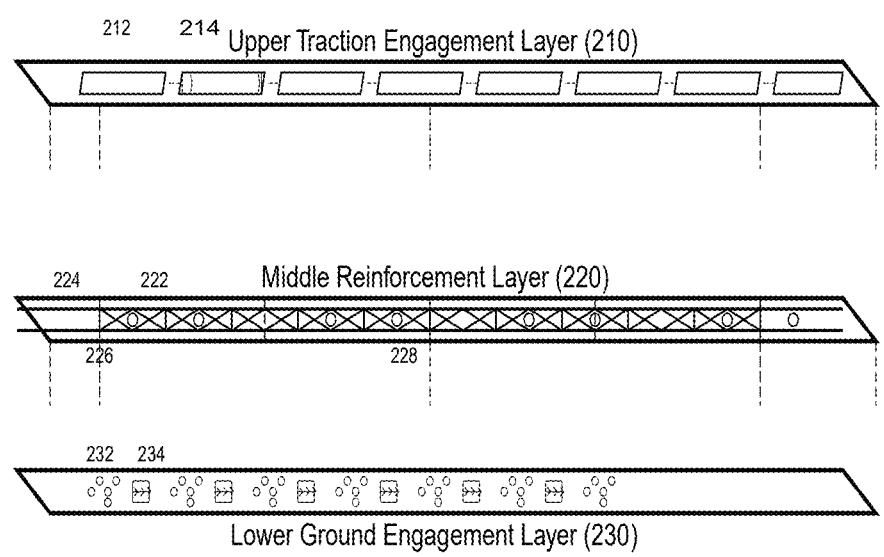
FIG. 2 is an exploded view showing the multi-layered construction of the traction recovery system.

FIG. 2 provides an exploded view illustrating the multi-layered construction of the traction recovery system 100. The system comprises at least three primary layers: an upper traction engagement layer 210, a middle reinforcement layer 220, and a lower ground engagement layer 230.

The upper traction engagement layer 210 features a specialized pattern of directional ridges 212 and channels 214 configured to maximize engagement with tire treads. Unlike conventional solutions that rely primarily on surface texture, these directional ridges 212 incorporate a unique asymmetrical geometry with a leading edge angle $\alpha_1$ substantially different from trailing edge angle $\alpha_2$ (typically $\alpha_1$=25-35° and $\alpha_2$=55-65°. This asymmetry creates a mechanical bias that enhances the self-feeding mechanism by converting rotational energy into linear motion.

The upper traction engagement layer 210 is fabricated from a proprietary thermoplastic elastomer compound incorporating silica nanoparticles and carbon fiber strands to provide exceptional abrasion resistance while maintaining high coefficient of friction even at extreme temperatures (−40° F. to 140° F./−40° C. to 60° C.). The Shore A hardness of this layer preferably ranges between 65-75, providing optimal deformation characteristics to conform to tire tread patterns without excessive permanent deformation.

The middle reinforcement layer 220 comprises a lattice structure of high-tensile aramid fibers 222 arranged in a modified honeycomb pattern with longitudinal reinforcement bands 224. This unique arrangement provides exceptional tensile strength (exceeding 25,000 psi) while permitting controlled flexibility along predetermined bend lines 226. The bend lines 226 are strategically positioned to facilitate rolling for storage while providing rigid segments during deployment. The middle reinforcement layer 220 also incorporates a series of resonance dampening nodes 228 that absorb and dissipate vibrational energy generated during tire engagement, preventing harmonic oscillations that could dislodge the system during critical initial engagement.

The lower ground engagement layer 230 represents a significant innovation over existing solutions through its bidirectional gripping mechanism. Rather than employing conventional spikes or cleats that penetrate the substrate (which can fail on hard ice or packed snow), this layer utilizes an array of microscale suction elements 232 interspersed with directional friction pads 234. The suction elements 232 comprise microscale chambers with non-return valves that create localized negative pressure zones upon compression, while the directional friction pads 234 feature anisotropic coefficient of friction (typically 0.8-0.9 in the rearward direction and 0.2-0.3 in the forward direction). This combination creates substantial resistance to forward slippage while facilitating insertion during the initial deployment phase.

Self-Feeding Mechanism

Figure 3A:
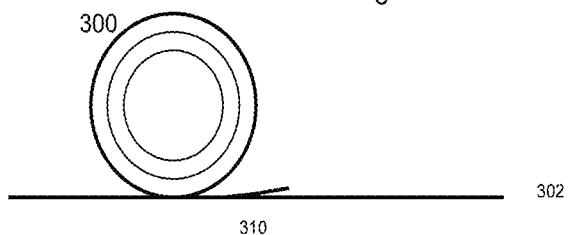
FIGS. 3A-3D are sequential side views illustrating the self-feeding mechanism during operation.

FIG. 3A to FIG. 3D illustrate the sequential operation of the self-feeding mechanism that represents a core innovation of the present invention. Referring to FIG. 3A, the tapered leading edge section 310 of the traction recovery system 100 is positioned adjacent to a tire 300 that is immobilized on a low-friction surface 302. The tapered leading edge section 310 features a compound curve with decreasing thickness toward the very front edge, creating an insertion profile that requires minimal clearance between the tire 300 and the surface 302.

Figure 3B:
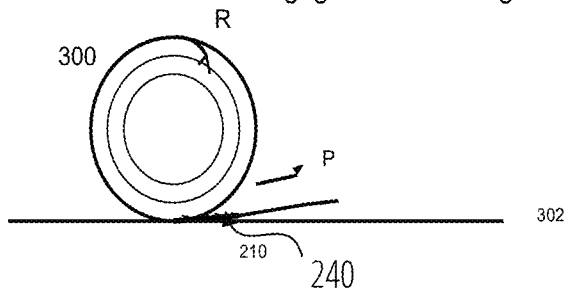

As shown in FIG. 3B, when the tire 300 begins to rotate (indicated by arrow R), the directional ridges 240 of the upper traction engagement layer 210 engage with the tire tread, creating a pulling force (indicated by arrow P) that draws the traction recovery system 100 beneath the tire 300. Importantly, this pulling force P is generated by the rotation of the tire itself, eliminating the need for external positioning beyond the initial placement of the tapered leading edge 310.

Figure 3C:
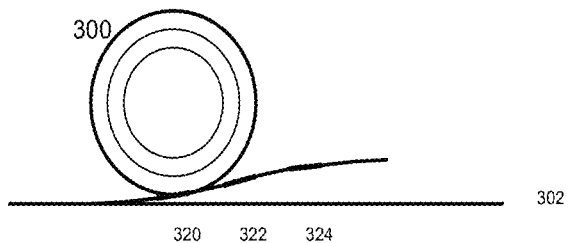

FIG. 3C illustrates the progressive elevation feature, wherein a series of graduated elevation segments 320, 322, 324 create a ramped surface that gradually raises the tire 300 from the low-friction surface 302. Each elevation segment increases in height by a predetermined increment (typically 0.1-0.2 inches/2.5-5.1 mm) and features a specific length calculated to optimize force distribution during the critical weight transfer phase. This gradual elevation reduces the initial torque required to begin movement while distributing the vehicle's weight across multiple contact points, preventing the system from being pushed forward rather than drawn underneath.

Figure 3D:
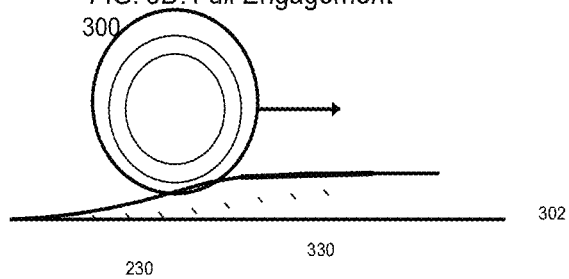

FIG. 3D shows the full engagement phase, wherein the tire 300 has been elevated onto the main body section 330 of the traction recovery system 100. At this point, the bidirectional gripping mechanism of the lower ground engagement layer 230 provides maximum resistance against forward slippage, while the full width of the upper traction engagement layer 210 provides consistent traction to the tire 300, allowing forward progression of the vehicle.

The asymmetrical directional ridges, having a leading edge angle of 25° 35° and a trailing edge angle of 55° 65°, act in conjunction with the progressive elevation segments to form a compound mechanical advantage. This cooperation reduces the torque required to lift the tire and improves alignment as the strip self-inserts beneath the rotating wheel.

Lateral Stabilization System

Figure 4:
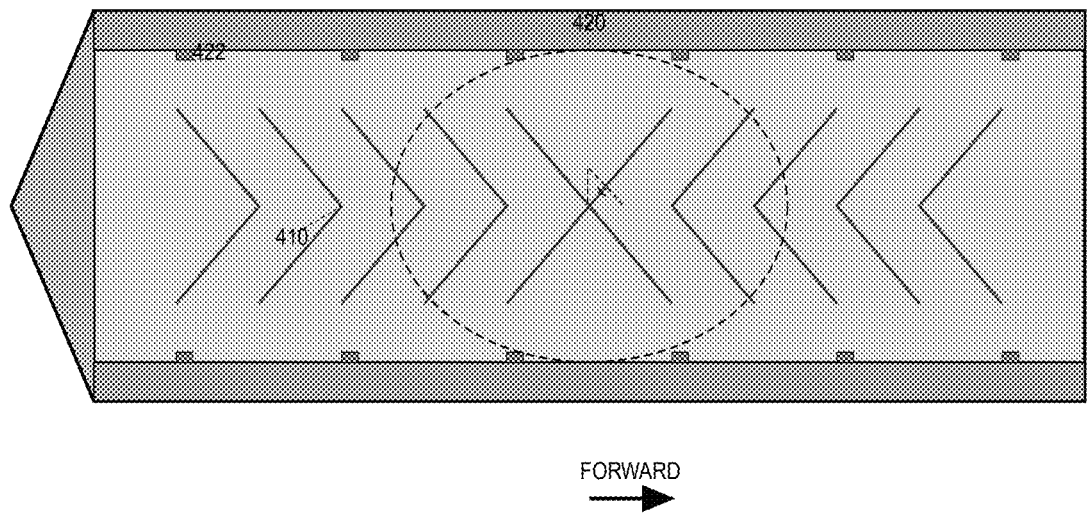
FIG. 4 is a top view of the traction recovery system showing the tread engagement surface.

Referring now to FIG. 4, a top view of the traction recovery system 100 illustrates the novel lateral stabilization system that prevents sideways displacement during operation. The system includes a series of self-centering channels 410 arranged in a herringbone pattern with convergence angle β (typically) 15-25°. These channels 410 work in conjunction with lateral stability ridges 420 positioned along both longitudinal edges of the system.

The self-centering channels 410 exploit the principles of vector force resolution to automatically guide the traction recovery system 100 toward centerline alignment with the tire, even when initial placement is slightly offset. This self-correction capability significantly enhances ease of use, particularly in challenging weather conditions or limited visibility scenarios.

The lateral stability ridges 420 provide additional resistance against sideways slippage through a combination of increased surface area and specialized geometry. Rather than simple raised edges, these ridges incorporate a variable-height profile with undercut sections 422 that create mechanical interference against lateral movement once compressed under the tire's weight.

Ground Engagement Surface

Figure 5:
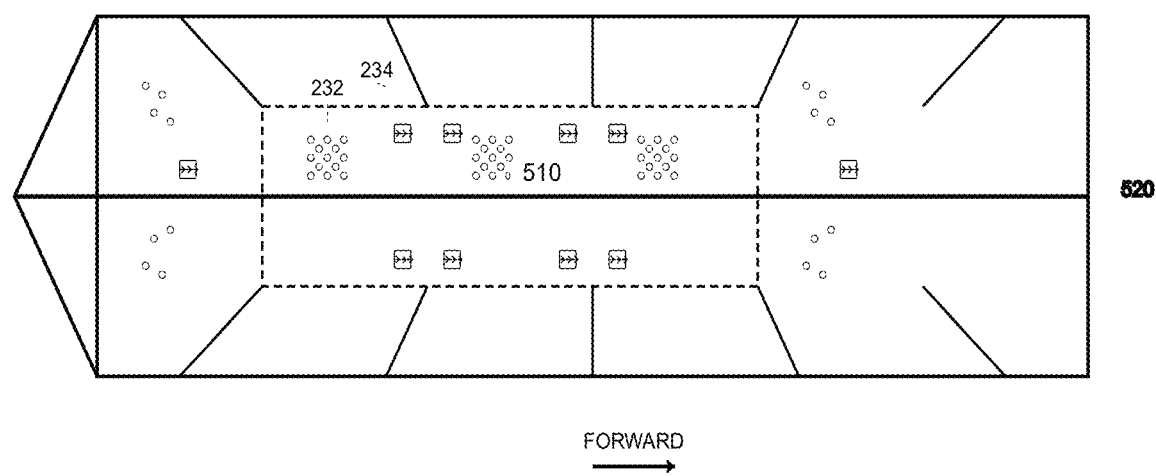
FIG. 5 is a bottom view of the traction recovery system showing the ground-engaging surface.

FIG. 5 provides a bottom view illustrating the specialized ground engagement surface of the lower layer 230. The arrangement of microscale suction elements 232 and directional friction pads 234 follows a proprietary distribution algorithm that optimizes traction across multiple surface types. This distribution is not uniform but rather concentrated in primary load-bearing zones 510 determined through finite element analysis of typical weight distribution patterns.

The microscale suction elements 232 are arranged in clusters with varying density gradients, creating differential adhesion zones that maintain at least partial engagement even on irregular surfaces. Each suction element comprises a flexible chamber with a minute central opening and reinforced sidewalls that deform under pressure to expel air, creating localized vacuum that enhances adhesion to the surface.

The directional friction pads 234 utilize a biomimetic microstructure inspired by gecko setae, with asymmetrical microscale projections measuring 15-30 µm in length. These projections lie flat when moved in one direction but engage when force is applied in the opposite direction, creating substantial anisotropic friction properties without requiring penetration into the substrate.

Additionally, drainage channels 520 are strategically positioned to evacuate water, slush, or liquefied mud from beneath the system, preventing hydroplaning effects that could compromise traction. These channels follow computational fluid dynamics-optimized pathways to maximize flow rate while minimizing structural compromise.

Microscale suction elements incorporate non-return valve membranes that trap air and generate negative pressure zones. In cold environments, thermal conductive threads integrated into the suction chambers reduce ice crystallization and enhance ground adhesion on icy surfaces.

Figure 6:
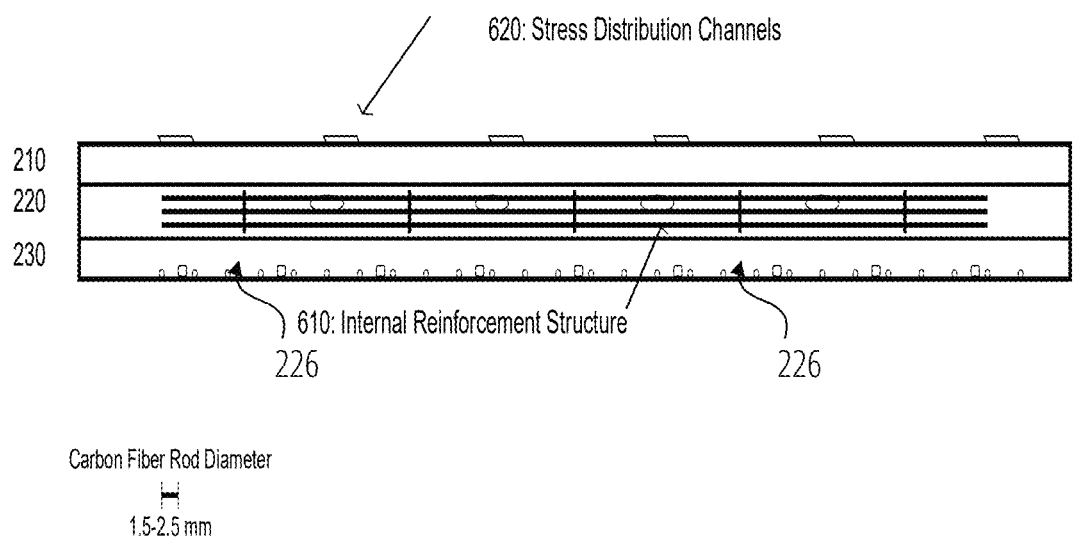
FIG. 6 is a cross-sectional view.

FIG. 6 presents a cross-sectional view illustrating the integration of the various layers and features. The upper traction engagement layer 210, middle reinforcement layer 220, and lower ground engagement layer 230 are permanently bonded using a proprietary vulcanization process that creates molecular crosslinking between layers rather than relying solely on adhesives, which could delaminate under extreme conditions.

The cross-section also reveals the internal reinforcement structure 610, comprising a network of carbon fiber reinforcement rods embedded within the middle layer 220. These rods, measuring 1.5-2.5 mm in diameter, are positioned to create a truss-like internal architecture that provides exceptional compressive strength while maintaining flexibility along predetermined bend lines 226.

Stress distribution channels 620 are visible as void spaces within the cross-section, strategically positioned to allow controlled deformation under load. These channels prevent catastrophic structural failure by redirecting stress concentrations away from critical junctions and allowing localized compression without affecting overall structural integrity.

Leading Edge Construction

Figure 7:
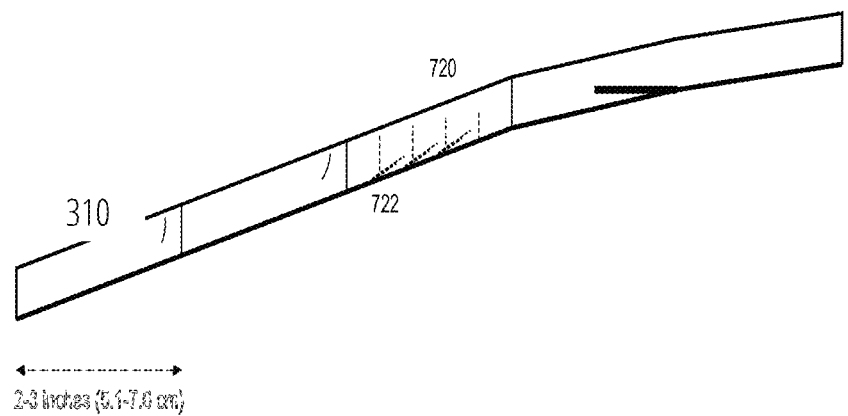
FIG. 7 is a detailed view of the tapered leading edge section.

FIG. 7 provides a detailed view of the tapered leading edge section 310, highlighting several innovative features that facilitate initial engagement. The leading edge incorporates a multi-angle approach profile with primary insertion angle $\gamma_1$ (typically) 12-18° transitioning to secondary elevation angle $\gamma_2$ (typically 25-35°) through a continuous curve rather than an abrupt transition.

The leading edge material composition differs from the main body, utilizing a more rigid thermoplastic polyurethane with Shore D hardness of 45-55 to maintain structural integrity during forced insertion. This material is overmolded with a low-friction coefficient coating 710 on the upper surface of the very tip (extending approximately 2-3 inches/ 5.1-7.6 cm) to facilitate initial positioning beneath the tire edge.

Of particular significance is the variable-thickness transition zone 720, which creates a non-linear stiffness gradient that prevents buckling during the critical initial loading phase. This zone incorporates micro-reinforcement filaments 722 arranged in an asymmetrical pattern to provide directional stiffness, resisting deformation when pulled underneath the tire while allowing controlled flexibility when rolled for storage.

Progressive Elevation System

Figure 8:
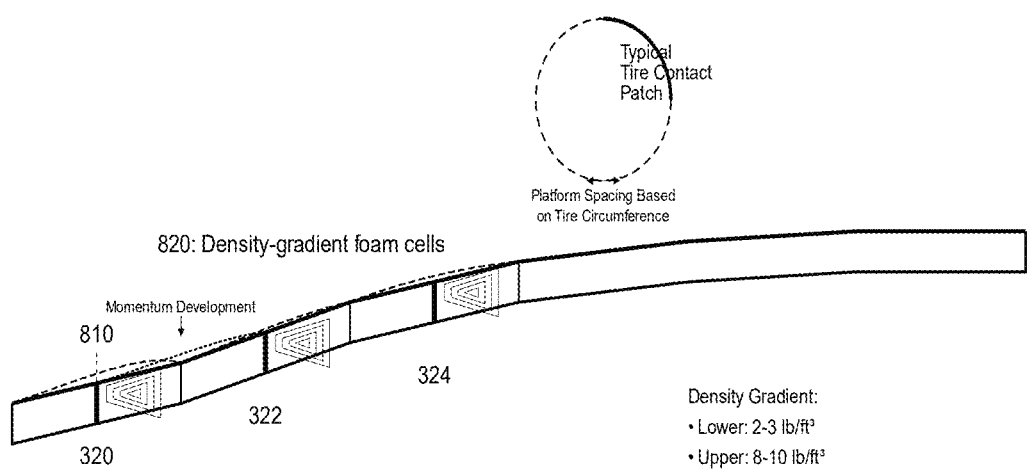
FIG. 8 is a detailed view of the progressive elevation segments.

FIG. 8 illustrates the detailed construction of the progressive elevation segments 320, 322, 324. Unlike conventional ramp designs that utilize a constant slope, these segments implement a mathematically optimized variable-radius curve that maximizes the mechanical advantage during initial movement while ensuring stability during the transition phase.

Each elevation segment includes embedded foam cells with a temperature-sensitive density gradient. Below freezing, the foam stiffens to maintain load support and reduce compression deformation, improving performance on icy terrain. This structure provides dynamic support responsive to environmental conditions.

Each elevation segment incorporates load distribution platforms 810 at specific intervals, creating briefly level regions that allow momentum development before encountering the next elevation increment. The spacing between these platforms is calculated based on typical tire circumference measurements to ensure that at least one contact patch of the tire is engaged with a platform at all times.

The internal structure of each elevation segment includes density-gradient foam cells 820 that provide progressive resistance to compression. These cells range from lower density (typically 2-3 lb/ft$^3$) at the bottom to higher density (typically 8-10 lb/ft$^3$) at the top, creating a cushioning effect that absorbs initial impact while preventing excessive compression under full vehicle weight.

Storage Configuration

Figure 9:
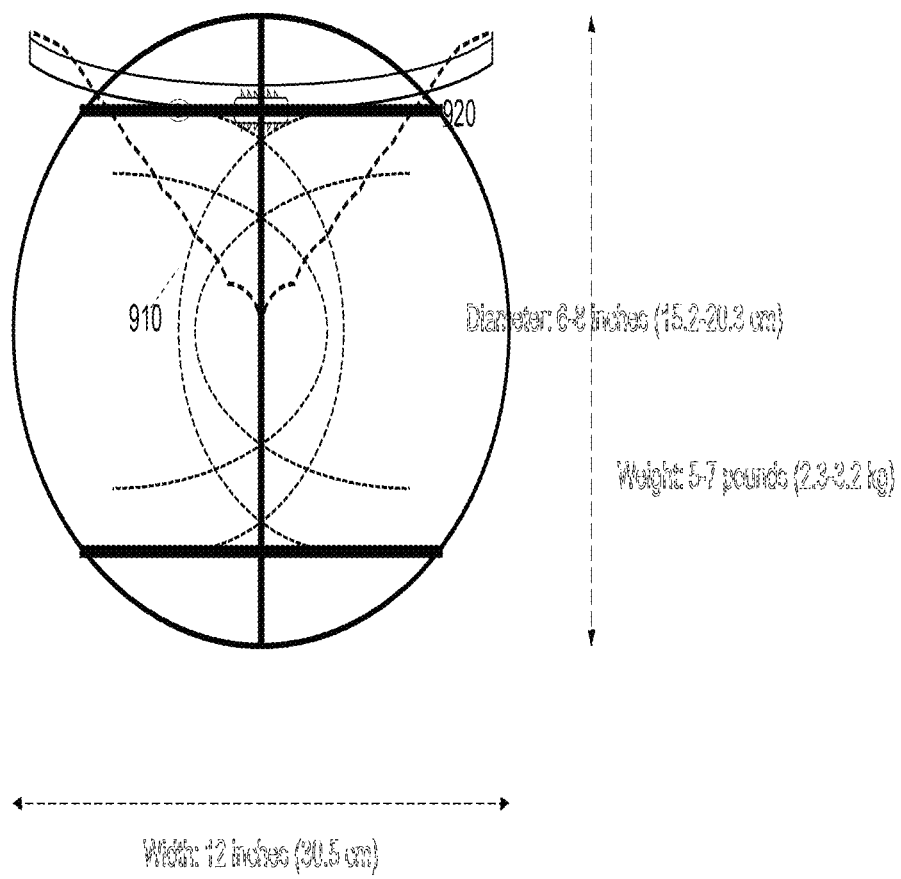
FIG. 9 is a perspective view showing the system in its rolled storage configuration.

FIG. 9 shows the traction recovery system 100 in its rolled storage configuration. The system is designed to roll along predetermined flex lines 910 that are reinforced against material fatigue. Unlike conventional flexible materials that experience stress concentration at fold points, these flex lines incorporate elastomeric hinge zones with nanoscale engineering to distribute bending forces across thousands of molecular chain segments rather than concentrating stress at specific points.

The rolled configuration is secured using integrated containment straps 920 that employ mechanical interlocking rather than traditional hook-and-loop fasteners, which can become compromised when exposed to mud or ice. These straps utilize a specialized gear-tooth pattern that provides secure locking while remaining easy to release even with gloved hands or when partially obscured by debris.

In the rolled configuration, the system achieves a compact form approximately 12 inches (30.5 cm) in width and 6-8 inches (15.2-20.3 cm) in diameter, weighing approximately 5-7 pounds (2.3-3.2 kg) depending on specific model variations. This compact form factor allows for convenient storage in a vehicle's trunk or cargo area.

Self-Deploying Multi-Strip System

In some embodiments, multiple traction strips may be connected by retractable cords with spooled tensioners. A single deployment of one strip triggers subsequent deployment of the next, enabling rapid multi-wheel placement without repeated manual intervention. The cords are housed in retractable spools embedded in the lateral ridges of each strip and are coated to resist abrasion and mud fouling.

Force Distribution Analysis

Figure 10:
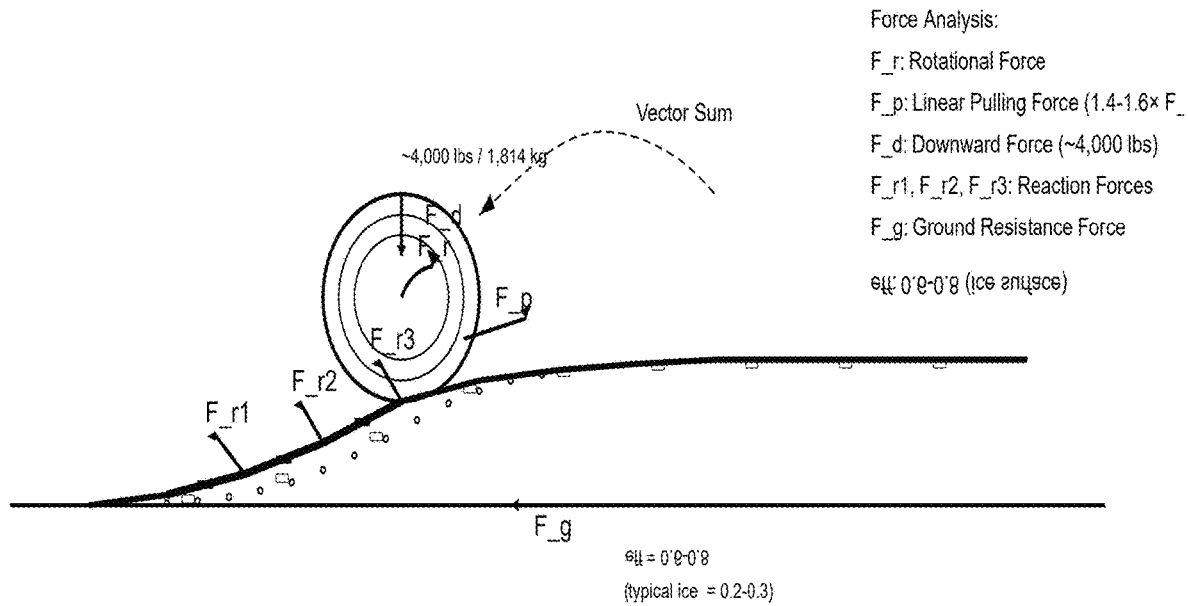
FIG. 10 is a diagram illustrating the force distribution during operation.

FIG. 10 provides a diagram illustrating the force distribution during operation of the traction recovery system 100. When a typical passenger vehicle (weight approximately 4,000 lbs/1,814 kg) engages with the system, the applied forces are managed through several innovative mechanisms.

The rotational force of the tire ($F\_r$) is converted to linear pulling force ($F\_p$) through the directional ridges of the upper layer. This conversion is optimized through the asymmetrical ridge geometry, achieving typical force multiplication of 1.4-1.6× depending on tire tread pattern and rotation speed.

Downward force from the vehicle's weight ($F\_d$) is distributed across the progressive elevation segments through the load distribution platforms, creating reaction forces ($F\_r1$, $F\_r2$, $F\_r3$) that are angled to partially counteract forward slippage forces. The vector sum of these reaction forces contributes to the stability of the system during the critical transition phase.

The bidirectional gripping mechanism of the lower layer creates substantial resistance force ($F\_g$) against forward slippage. Through the combined action of the microscale suction elements and directional friction pads, this resistance force typically achieves effective coefficient of friction values of 0.6-0.8 even on smooth ice, representing a substantial improvement over conventional solutions (typically 0.2-0.3).

In one embodiment, embedded pressure sensors transmit tire weight distribution to a mobile device.

In one embodiment, self-deploying connector mechanism link two or more strips via retractable cords for sequential deployment under multiple wheels.

Figure 11:
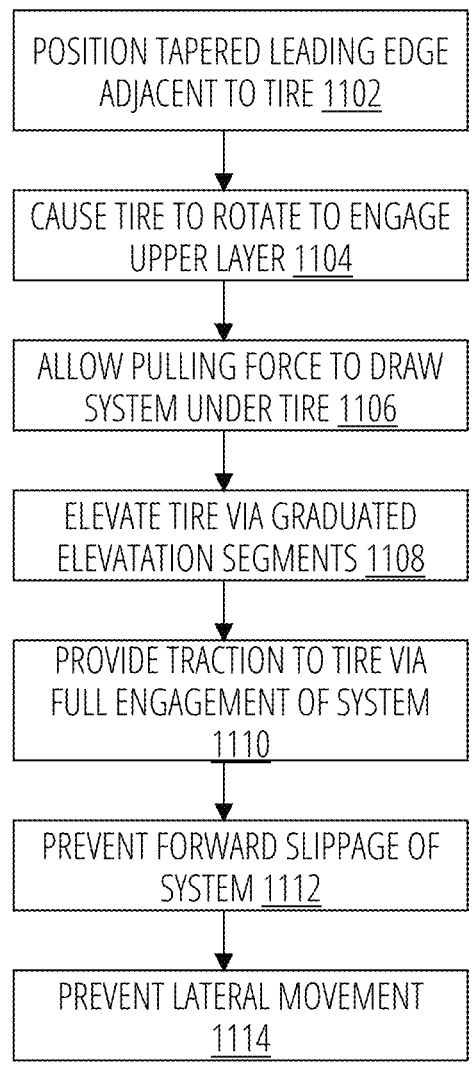
FIG. 11 illustrates a method for using the system.

FIG. 11 illustrates a method for using the system. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Use begins by positioning the tapered leading edge of the system adjacent to tire 1102.

Then, the user causes the tire to rotate to engage upper layer of the system 1104.

Those movements create a pulling force that draws the system under tire 1106.

The tire thus is elevated tire via graduated elevation segments 1108.

The method then provides traction to the tire via full engagement of the system 1110.

System design prevents forward slippage of the system 1112.

Other aspects of system design prevent lateral movement 1114.

Key innovative elements include:

Multi-layered construction with specialized materials in each layer

Asymmetrical directional ridges that convert rotational energy into linear motion Microscale suction elements combined with directional friction pads for superior ground grip Progressive elevation system with mathematically optimized variable-radius curves Self-centering channels arranged in a herringbone pattern Resonance dampening nodes to prevent dislodging during initial engagement Specialized rolling mechanism for compact storage The system comprises non-trivial integration of features; the system is more than a sum of its parts. The self-feeding mechanism (with asymmetrical directional ridges) works in tandem with the variable-radius elevation segments, and ground grip technologies, suggesting non-obvious functional synergy.

The prior art contains no direct teaching or suggestion. While individual elements (traction mats, suction cups, etc.) are known, no prior art suggests or teaches combining them in this manner to achieve automatic, torque-assisted insertion under a tire.

The system solves a longstanding user problem. Many single-operator recovery scenarios fail due to dislodgement or incorrect placement of mats. This design addresses that through self-centering, self-feeding, and progressive engagement-suggesting a non-obvious solution to a persistent issue.

The system's material and structure are complex. The inclusion of nano-engineered flex lines, multi-layer bonding with molecular crosslinking, and resonance dampening nodes shows design complexity not found in obvious modifications of known products.

I claim:

1. A traction recovery system for vehicles on low-friction surfaces, comprising:
   a tire;
   a flexible elongated strip having a length dimension at least three times greater than its width dimension, which is in turn at least eight times greater than its thickness dimension;
   an upper traction engagement layer comprising directional ridges with asymmetrical geometry to engage with tire treads and convert rotational energy into linear motion;
   a middle reinforcement layer comprising a lattice structure of high-tensile fibers with a modified honeycomb pattern with longitudinal reinforcement bands;
   a lower ground engagement layer comprising an array of microscale suction elements with non-return valve structures interspersed with directional friction pads that create resistance of at least 0.8 coefficient of friction to forward slippage;
   a tapered leading edge section with a multi-angle insertion profile and variable-stiffness transition zone configured to prevent buckling during initial engagement with a compound curve with decreasing thickness toward said leading-edge section, creating an insertion profile requiring minimal clearance between a tire and surface; and
   a plurality of progressive elevation segments configured with variable-radius curvature and embedded load distribution platforms at spacing intervals corresponding to typical tire contact patches;
   wherein said directional ridges and said plurality of progressive elevation segments operate cooperatively to reduce initial torque required to begin tire ascent and maintain stable insertion of the strip beneath the tire without external force.

2. The system of claim 1, wherein the microscale suction elements comprise flexible chambers with embedded thermal conductors configured to reduce ice adhesion.

3. The system of claim 1, further comprising a lateral stabilization system including self-centering herringbone channels configured to realign the strip when initially misaligned by up to 10 degrees.

4. The system of claim 1, wherein the elevation segments comprise variable-density foam cells that respond to temperature changes by increasing compression resistance below 0° C.

5. The system of claim 1, wherein the directional friction pads comprise biomimetic setae structures with asymmetrical surface projections producing anisotropic friction in forward and rearward directions.

6. The system of claim 1, further comprising a self-deploying connector mechanism linking two or more strips via retractable cords for sequential deployment under multiple wheels.

7. The system of claim 1, further comprising embedded pressure sensors configured to transmit tire weight distribution to a mobile device.

8. The system of claim 1, wherein the upper traction engagement layer, middle reinforcement layer, and lower ground engagement layer are permanently bonded using a vulcanization process that creates molecular crosslinking between layers.

9. The system of claim 1, further comprising an internal reinforcement structure comprising a network of carbon fiber reinforcement rods embedded within the middle layer, positioned to create a truss-like internal architecture.

10. The system of claim 1, wherein the tapered leading edge material composition differs from the main body, utilizing a more rigid thermoplastic polyurethane with a low-friction coefficient coating on the upper surface of the tapered leading edge.

11. The system of claim 1, wherein the system is designed to roll along predetermined flex lines that are reinforced against material fatigue through elastomeric hinge zones with nanoscale engineering.

12. The system of claim 11, further comprising integrated containment straps that employ mechanical interlocking with a specialized gear-tooth pattern that provides secure locking while remaining easy to release.

13. The system of claim 1, wherein the directional ridges of the upper layer achieve force multiplication of rotational force to linear pulling force through asymmetrical ridge geometry.

14. The system of claim 1, further comprising drainage channels strategically positioned to evacuate water, slush, or liquefied mud from beneath the system, preventing hydroplaning effects.

15. The system of claim 1, wherein the internal structure of each elevation segment includes density-gradient foam cells that provide progressive resistance to compression.

16. The system of claim 1, wherein the middle reinforcement layer includes resonance dampening nodes that absorb and dissipate vibrational energy generated during tire engagement.

17. A method of recovering a vehicle immobilized on a low-friction surface using a traction recovery system, comprising:
    positioning a tapered leading edge section with a multi-angle insertion profile and variable-stiffness transition zone of the traction recovery system adjacent to a tire that is immobilized on the low-friction surface;
    causing rotation of the tire to engage with directional ridges having asymmetrical geometry of an upper traction engagement layer of the traction recovery system;
    allowing a pulling force that draws the traction recovery system beneath the tire through conversion of rotational energy into linear motion via the asymmetrical geometry of the directional ridges;
    progressively elevating the tire from the low-friction surface via a series of graduated elevation segments configured with variable-radius curvature and embedded load distribution platforms at spacing intervals corresponding to typical tire contact patches that create a ramped surface; and
    providing traction to the tire via full engagement with a main body section of the traction recovery system while preventing forward slippage via an array of microscale suction elements with non-return valve structures interspersed with a bidirectional gripping mechanism of a lower ground engagement layer.

18. A traction recovery system for vehicles on low-friction surfaces, comprising:
    a flexible elongated strip having a length dimension at least three times greater than its width dimension, which is in turn at least eight times greater than its thickness dimension, configured to be positioned adjacent to a tire immobilized on a low-friction surface;
    means for engaging with tire tread to create a pulling force that draws the strip beneath the tire when the tire rotates, said means comprising directional ridges with asymmetrical geometry that convert rotational energy into linear motion;
    means for progressively elevating the tire from the low-friction surface, said means comprising graduated elevation segments configured with variable-radius curvature and embedded load distribution platforms at spacing intervals corresponding to typical tire contact patches;
    means for preventing forward slippage of the strip relative to the low-friction surface, said means comprising an array of microscale suction elements with non-return valve structures interspersed with directional friction pads that create resistance of at least 0.8 coefficient of friction;
    means for preventing lateral displacement of the strip during operation, said means comprising a lateral stabilization system including self-centering herringbone channels configured to realign the strip when initially misaligned by up to 10 degrees; and
    means for compactly storing the strip when not in use, said means comprising integrated containment straps that employ mechanical interlocking with a specialized gear-tooth pattern.

19. The traction recovery system of claim 18, further comprising means for distributing force across multiple contact points via the embedded load distribution platforms positioned at the spacing intervals corresponding to typical tire contact patches to prevent the strip from being pushed forward rather than drawn underneath the tire, wherein the load distribution platforms create localized contact zones that maintain engagement even during initial tire rotation phases.

* * * * *